(12) United States Patent
Balin et al.

(10) Patent No.: US 8,899,542 B2
(45) Date of Patent: Dec. 2, 2014

(54) SEAT TRACK SYSTEM

(75) Inventors: Alexander I. Balin, Ann Arbor, MI (US); Kyle Doxey, Ann Arbor, MI (US); Alexander Saveski, South Lyon, MI (US); Kurt A. Seibold, Whitmore Lake, MI (US); Ornela Zekavica, Novi, MI (US)

(73) Assignee: Johnson Controls Technology Company, Holland, MI (US)

( * ) Notice: Subject to any disclaimer, the term of this patent is extended or adjusted under 35 U.S.C. 154(b) by 305 days.

(21) Appl. No.: 13/516,322

(22) PCT Filed: Dec. 17, 2010

(86) PCT No.: PCT/US2010/061064
§ 371 (c)(1),
(2), (4) Date: Aug. 23, 2012

(87) PCT Pub. No.: WO2011/075661
PCT Pub. Date: Jun. 23, 2011

(65) Prior Publication Data
US 2012/0305734 A1      Dec. 6, 2012

Related U.S. Application Data

(60) Provisional application No. 61/287,782, filed on Dec. 18, 2010.

(51) Int. Cl.
| | | |
|---|---|---|
| *F16M 13/00* | (2006.01) | |
| *B60N 2/07* | (2006.01) | |
| *B60N 2/08* | (2006.01) | |
| *B60N 2/68* | (2006.01) | |
| *B60N 2/70* | (2006.01) | |

(52) U.S. Cl.
CPC *B60N 2/07* (2013.01); *B60N 2/072* (2013.01); *B60N 2/0825* (2013.01); *B60N 2/0843* (2013.01); *B60N 2/68* (2013.01); *B60N 2/7094* (2013.01)
USPC .................. 248/430; 248/424; 297/344.11

(58) Field of Classification Search
CPC .... B60N 2/072; B60N 2/7094; B60N 2/0843; B60N 2/0825; B60N 2/68; B60N 2/07
USPC .............. 248/430, 429, 424, 419; 297/344.11
See application file for complete search history.

(56) References Cited

U.S. PATENT DOCUMENTS 4,533,107 A * 8/1985 Okazaki et al. ............... 248/430
4,776,551 A * 10/1988 Nishino ........................ 248/429

(Continued)

FOREIGN PATENT DOCUMENTS

| JP | 2-26949 | 2/1990 |
|---|---|---|
| WO | 2008154540 A1 | 12/2008 |

OTHER PUBLICATIONS

Translation of "Notice of Reasons for Rejection," (Office Action), date of delivery Nov. 5, 2013.

*Primary Examiner* — Anita M King
(74) *Attorney, Agent, or Firm* — Butzel Long

(57) ABSTRACT

A seat track system for use in a vehicle seat assembly having a seat base frame. The seat track system includes a lower track assembly having a first lower track and a second lower track and an upper track assembly having a first upper track slidably disposed within the first lower track and a second upper track slidably disposed within the second lower track. The first upper track has a portion extending upwards that forms a first side member of the seat base frame and the second upper track has a portion extending upwards that forms a second side member of the seat base frame. The first upper track and the first side member are formed integrally to form a one-piece unitary member and the second upper track and the second side member are formed integrally to form a one-piece unitary member.

12 Claims, 13 Drawing Sheets

(56) References Cited

U.S. PATENT DOCUMENTS

| | | | |
|---|---|---|---|
| 4,828,214 A * | 5/1989 | Kanai et al. | 248/430 |
| 5,048,787 A * | 9/1991 | Saitoh | 248/430 |
| 5,192,045 A | 3/1993 | Yamada et al. | |
| 5,468,050 A | 11/1995 | Hall et al. | |
| 5,676,341 A * | 10/1997 | Tarusawa et al. | 248/430 |
| 5,897,091 A * | 4/1999 | Hayakawa et al. | 248/430 |
| 6,427,962 B1 * | 8/2002 | Rohee et al. | 248/424 |
| 7,309,107 B2 * | 12/2007 | Smith et al. | 297/344.11 |
| 7,931,246 B2 * | 4/2011 | Brewer et al. | 248/429 |
| 8,029,063 B2 * | 10/2011 | Kazyak et al. | 297/344.1 |
| 8,146,878 B2 * | 4/2012 | Kojima et al. | 248/429 |
| 8,196,888 B2 * | 6/2012 | Yamada et al. | 248/429 |
| 8,474,777 B2 * | 7/2013 | Nihonmatsu et al. | 248/429 |
| 8,646,742 B2 * | 2/2014 | Hayashi et al. | 248/430 |

* cited by examiner

SEAT TRACK SYSTEM

CROSS REFERENCE TO RELATED APPLICATIONS

This application claims the benefit of and priority to U.S. Provisional Application No. 61/287,782, filed Dec. 18, 2010, which is incorporated herein by reference.

BACKGROUND

The present disclosure relates generally to the field of seating for vehicles and more particularly, to a track system for use with an adjustable vehicle seat assembly.

DESCRIPTION OF THE RELATED ART

Vehicle seat assemblies are typically provided with a track system that enables the position of the seat assembly within a motor vehicle to be adjusted in the forward and rearward direction. Such adjustment capability is desirable to enable vehicle operators of various sizes to be seated comfortably and safely within the motor vehicle. Such seat assemblies typically include two or more tracks that move relative to one another. The tracks are generally self-supportive, meaning that the tracks can move relative to one another in an operable manner before being mounted to the seat assembly, to an adjacent track, and/or the vehicle. Such tracks may include a latching mechanism that releasably retains the tracks (and therefore the seat assembly) in a locked position relative to one another until the latch mechanism is released. Once the latch mechanism is released, the tracks can be moved relative to one another which enables the occupant of the seat assembly to adjust the position of the seat assembly and to then reengage or release the latching mechanism to hold the seat in the new location. Although functional, these known seat track systems can be relatively massive, costly, and unreliable.

Accordingly, there remains a continuing need to provide a reduced mass, low cost, reliable, widely acceptable seat track system or arrangement for providing translational adjustment would represent a significant advance in the art.

SUMMARY

Accordingly, the present disclosure relates to a seat track system for use in a vehicle seat assembly having a seat base frame. The seat track system includes a lower track assembly having a first lower track and a second lower track and an upper track assembly having a first upper track slidably disposed within the first lower track and a second upper track slidably disposed within the second lower track. The first upper track has a portion extending upwards that forms a first side member of the seat base frame and the second upper track has a portion extending upwards that forms a second side member of the seat base frame. The first upper track and the first side member are formed integrally to form a one-piece unitary member and the second upper track and the second side member are formed integrally to form a one-piece unitary member.

Also provided is a seat track system for use in a vehicle seat assembly. The seat track system includes a seat base frame including a first side member, a second side member, a front cross member, and a rear cross member. The seat track system also includes a lower track assembly having a first lower track and a second lower track; and an upper track assembly having a first upper track slidably disposed within the first lower track and a second upper track slidably disposed within the second lower track. The first upper track is formed integrally with the first side member to form a one-piece member and the second upper track is formed integrally with the second side member to form a one-piece member.

An advantage of the present disclosure is that the seat track system has reduced mass. A further advantage of the present disclosure is that the seat adjuster is less costly to manufacture. Another advantage of the present disclosure is that the seat track system is more efficient and enhances vehicle seat performance.

Other features and advantages of the present disclosure will be readily appreciated, as the same becomes better understood after reading the subsequent description taken in conjunction with the accompanying drawings.

DESCRIPTION

Figure 1:
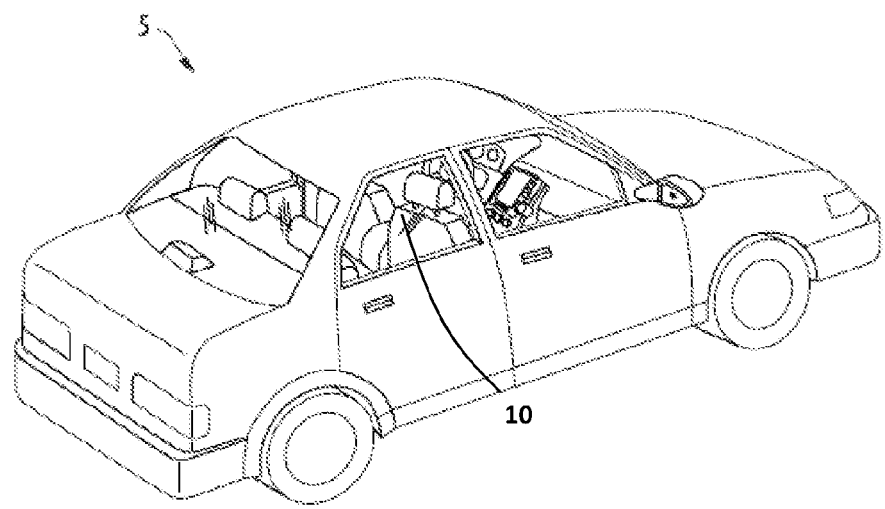
FIG. 1 is a perspective view of a vehicle having a vehicle seat assembly, according to an exemplary embodiment.

Referring generally to the FIGURES and particularly to FIG. 1, a vehicle 5 is shown according to an exemplary embodiment. The vehicle 5 can include one or more seat assemblies 10 provided for occupant(s) of the vehicle 5. While the vehicle 5 shown is a four door sedan, it should be understood that the seat assembly 10 may be used in a minivan, sport utility vehicle, airplane, boat, or any other type of vehicle.

Figure 2:
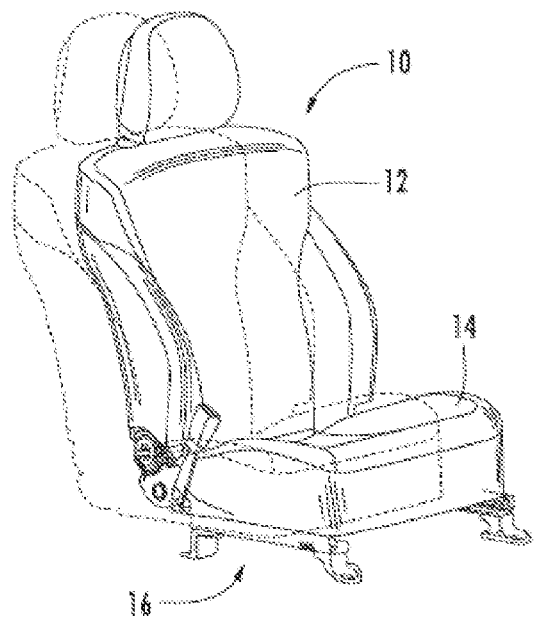
FIG. 2 is an isometric view of the seat in FIG. 1 including a seat track, according to an exemplary embodiment.
Figure 3:
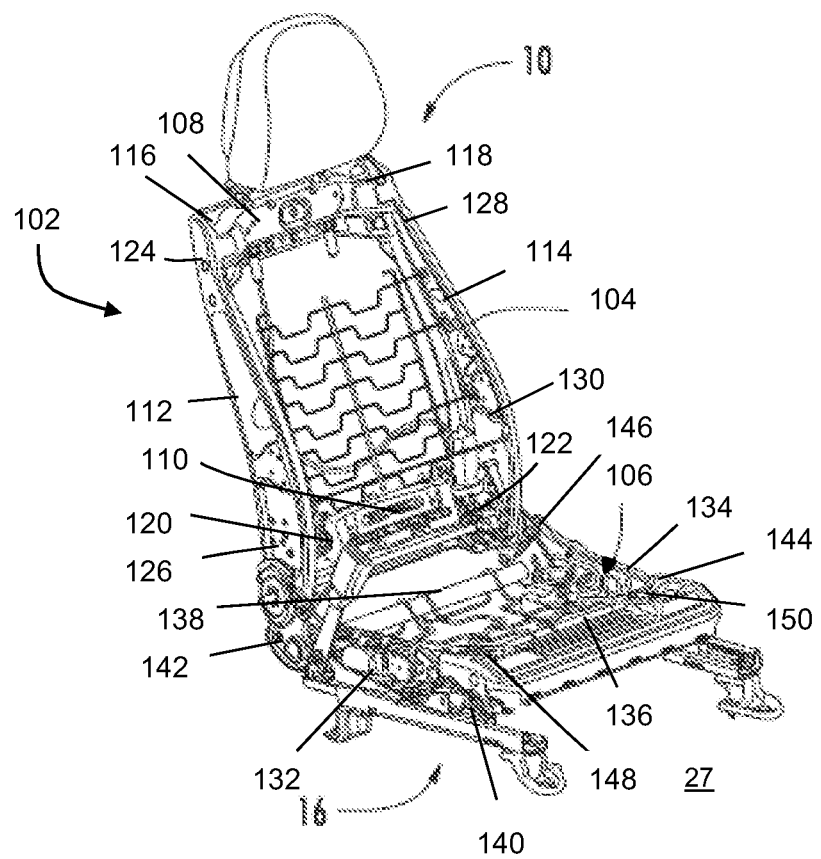
FIG. 3 is an isometric view of the seat in FIG. 2 showing the internal support structure.

Referring now to FIGS. 2 and 3, the vehicle seat 10 includes an upper portion, shown as a seat back 12 that extends substantially upward, and a generally horizontal lower portion, shown as a seat base 14 that extends outward from the bottom end of seat back 12. The seat back 12 may be pivotally connected to the seat base 14 through a recliner mechanism, or may be fixed relative thereto.

The seat assembly 10 also includes a seat frame 102, as shown in FIG. 3B. The seat frame 102 includes a seat back frame 104 and a seat base frame 106. The seat back frame 104 includes an upper cross member 108, an opposed lower cross member 110, a first seat back side member 112, and an opposed second seat back side member 114. The upper cross member 108 includes a first and a second end 116, 118 and the lower cross member 110 includes a first and second end 120, 122. The first seat back side member 112 includes an upper end 124 and an opposed lower end 126 and the second seat back side member 114 includes an upper end 128 and an opposed lower end 130. The upper ends of the first and second seat back side members 124, 128 are coupled together by the upper cross member 108 and the lower ends of the first and second seat back side members 126, 130 are coupled together by the lower cross member 110 such that a substantially rectangular frame structure is formed. The seat base frame 106 includes a first seat base side member 132, an opposed second seat base side member 134, a front cross member 136, and an opposed rear cross member 138. The first seat base side member 132 includes a front end 140 and a rear end 142 and the second seat base side member 134 includes a front end 144 and an opposed rear end 146. The front cross member 136 includes a first end 148 and a second end 150, and the rear cross member 138 includes a first end 152 and a second end 154. The front ends of the first and second seat base side member 140, 144 are coupled together by the front cross member 136 and the rear ends of the first and second seat base side member 142, 146 are coupled together by the rear cross tube member 138 such that a substantially rectangular frame structure is formed.

The vehicle seat also includes a support structure, shown as a seat track assembly 16. The vehicle seat 10 is coupled to the vehicle 5 through the seat track assembly 16, which is configured to allow a seat occupant to selectively adjust the position of vehicle seat 10 in a translational manner relative to a length of seat track assembly 16 (as shown by the phantom lines in FIG. 2). For example, the seat track assembly 16 may be arranged within the vehicle 5 in a manner that enables a vehicle seat occupant to selectively adjust the position of the vehicle seat 10 in a fore and aft direction, such as forward and rearward with respect to the vehicle 5, or the like.

Figure 4:
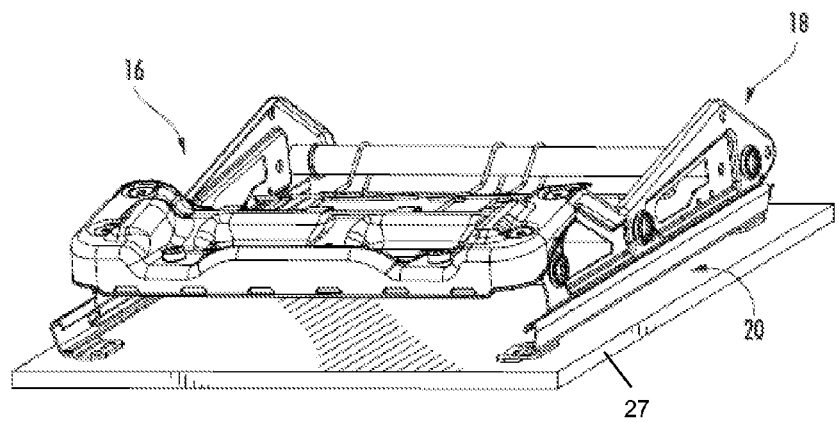
FIG. 4 is an isometric view of a seat track system, according to an exemplary embodiment.
Figure 5:
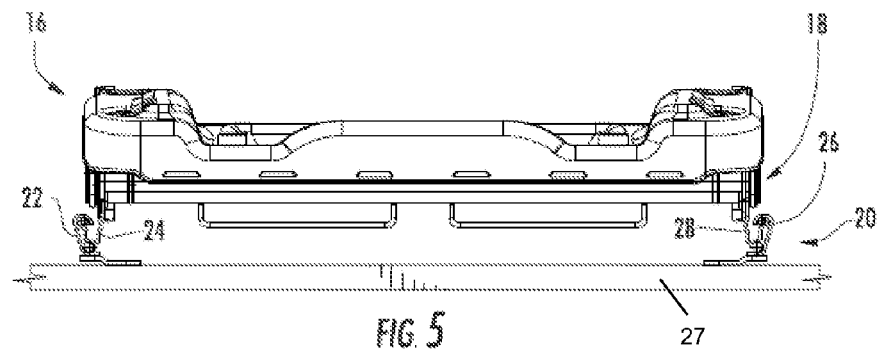
FIG. 5 is a front view of the seat track system in FIG. 4.
Figure 6:
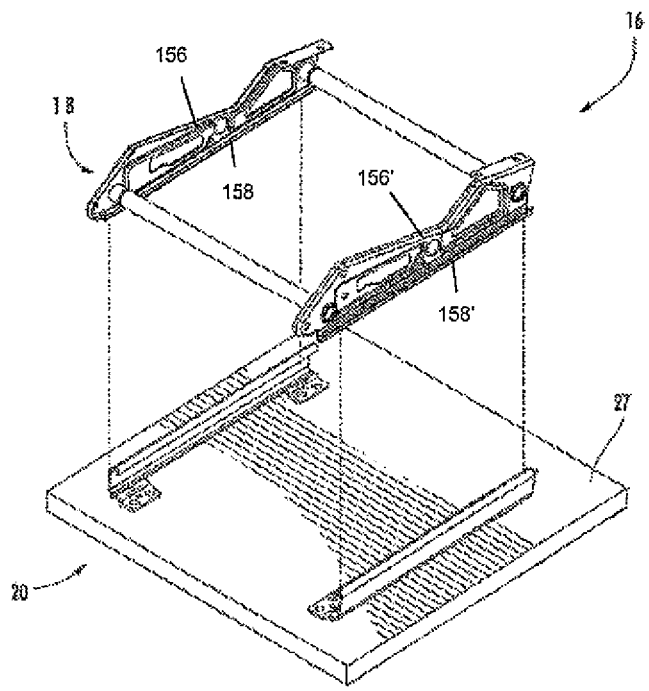
FIG. 6 is a partial exploded view of the seat track system in FIG. 4 showing the assembly of the seat track system.

Referring to FIGS. 4-6, according to an exemplary embodiment, the seat track system 16 generally includes a first track assembly, shown as an upper track assembly 18, and a second track assembly, shown as a lower track assembly 20. According to the embodiment illustrated, the upper track assembly 18 is configured to be affixed (formed, bolted, fastened, welded, or the like) to the vehicle seat 10, such as to the seat bottom 14, or the like. The lower track assembly 20 is configured to be affixed (formed, bolted, fastened, welded, or the like) to the vehicle 5, such as to a vehicle floor or floor panel, or the like. The upper track 18 assembly and the lower track assembly 20 are configured to operatively cooperate with each other to enable the movement or translation of the vehicle seat 10 relative to the vehicle 5 when a vehicle seat occupant actuates a lever or other actuator.

Figure 7:
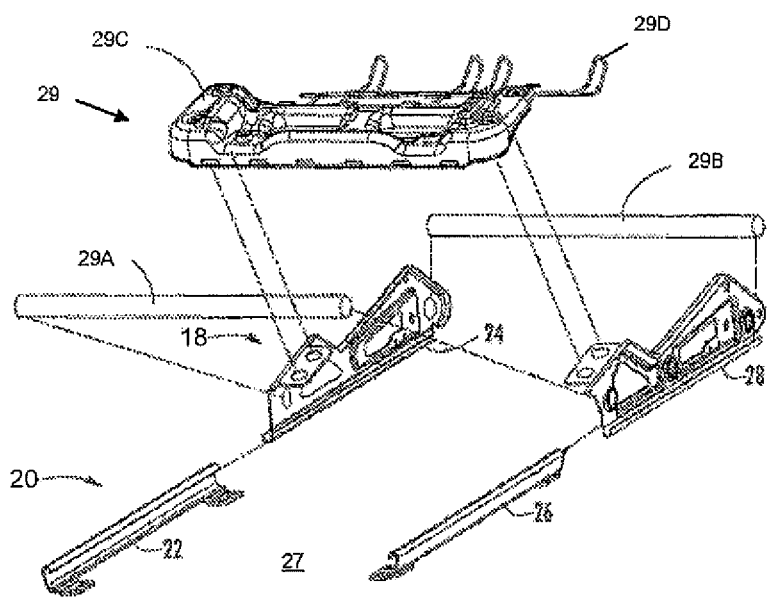
FIG. 7 is an exploded view of the seat track system of FIG. 4.

Referring now to FIG. 7, the upper track assembly 18 generally includes a first track member, shown as an upper inboard track member 24 and a second track member, shown as an upper outboard track member 28. The track members 24, 28 are generally elongated rails having a channel to be described in further detail below. A member, shown as a first support member 29, extends between upper inboard track member 24 and upper outboard track member 28. The first support member 29 can be in the form of cross support, cross bar, torsion tube, seat base, seat pan, or the like. According to the embodiment illustrated, the first support member includes a first torsion tube 29A, second torsion tube 29B, a seat pan 29C, and wire member 29D. The upper inboard track member 24 and upper outboard track member 28 are coupled by first support member 29 in a generally spaced-apart and parallel relationship, with upper inboard track member 24 being located at the inboard side of vehicle seat 10 and upper outboard track member 28 being located at the outboard side of vehicle seat 10.

The upper track assembly 18 is also designed to be a part of the seat base 14 subframe in that a portion of the upper tracks 24, 28 act as the seat base side members 132, 134. For example, the upper outboard and inboard track members 24, 28 have a substantially planar portion 156, 156' that extends from the track portion 158, 158'. The planar portions 156, 156' serve as the seat base side frame members 132, 134, in a manner to be described. The planar portions 156 and the track portions 158 may be formed integrally with one another to form a single unitary (one-piece) member. The support members 29 act as seat base cross members and are coupled to the upper outboard and inboard track members 24, 28 to form a substantially rectangular seat base frame 106.

Still referring to FIG. 7, the lower track assembly 20 generally includes a first track member, shown as a lower inboard track member 22 and a second track member, shown as a lower outboard track member 26. The track members 22, 26 are generally elongated rails having a channel to be described in further detail below. A member, shown as a second support member 27, extends between lower inboard track member 22 and lower outboard track member 26. The second support member 27 can be in the form of a floor base, or the like. According to the embodiment illustrated, lower inboard track member 22 and lower outboard track member 26 are configured to be coupled by second support member 27 (vehicle floor, a member used to hold lower inboard track member 22 and lower outboard track member 26 before and/or until lower track assembly 20 is mounted to vehicle 5, or the like) in a generally spaced-apart and parallel relationship, with lower inboard track member 22 being aligned with upper inboard track member and lower outboard track member 26 being aligned with upper outboard track member 28.

The design, configuration and profile of the track members of upper track assembly 18 and lower track assembly 20 provide a reduced cost and reduced mass track system compared to conventional track systems because the upper and lower track assembly form a part of the seat frame 102, such as the seat base frame 106. The mass of the track members can be reduced because seat track system 16 relies upon the structure of vehicle seat 10 (such as the seat base frame) and vehicle 5 (such as the vehicle floor) for stability, strength, rigidity and/or alignment rather than having the track members be self-supportive as conventional track assemblies are configured. For example, upper track assembly 18 may utilize seat bottom 14 as first support member 29, while lower track assembly 20 may utilize the vehicle floor as second support member 27. Further, without first and second support members 29 and 27, upper inboard track member 24 would fall out of alignment with lower inboard track member 22 leaving track system 16 substantially inoperable for its intended purpose. Advantageously, with the reduced mass, the track members have a smaller width than conventional track assemblies. The thinner profile of the track members provide more space for a latch and release system for the track system.

Referring back to FIG. 5, and according to the embodiment illustrated, upper inboard track member 24 is a mirror image of upper outboard track member 28, while lower inboard track member 22 is a mirror image of lower outboard track member 26. It is contemplated that the track members need not necessarily be a mirror image.

Figure 8:
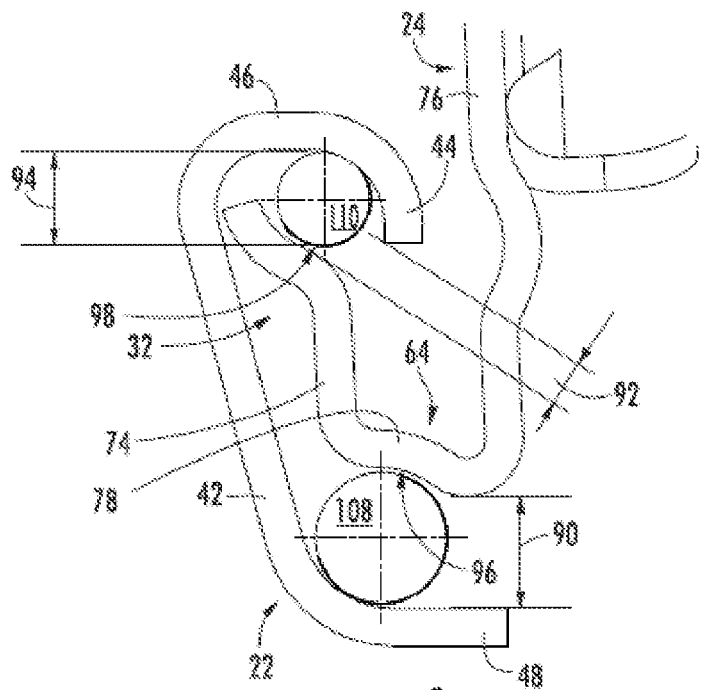
FIG. 8 is a detailed, partial front view of one side of the seat track system in FIG. 5 showing the upper seat track member in an unassembled (free) state.
Figure 9:
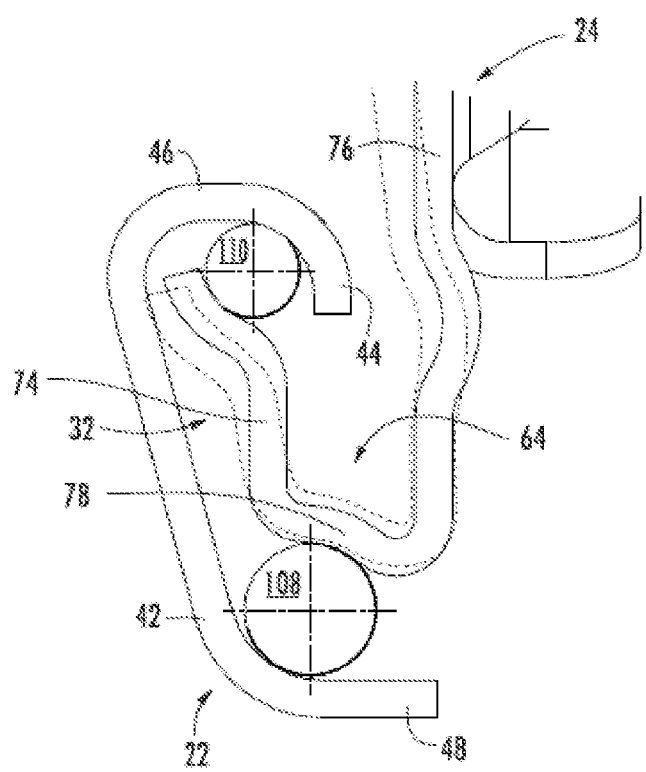
FIG. 9 is another detailed, partial front view of one side of the seat track system in FIG. 5 showing the upper seat track member in an assembled or use position in solid lines and in preassembled or nonuse position in phantom lines.
Figure 10:
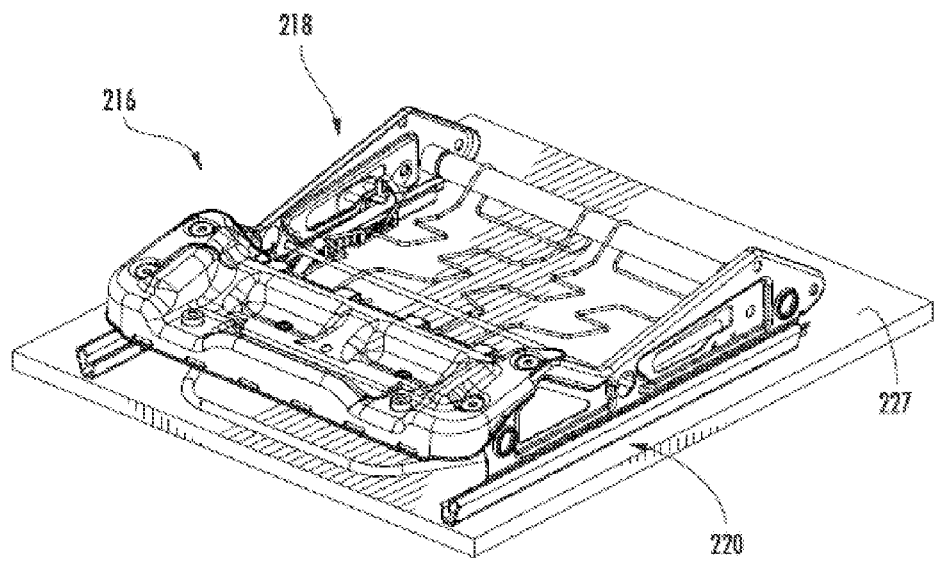
FIG. 10 is an isometric view of a seat track system, according to another exemplary embodiment.
Figure 11:
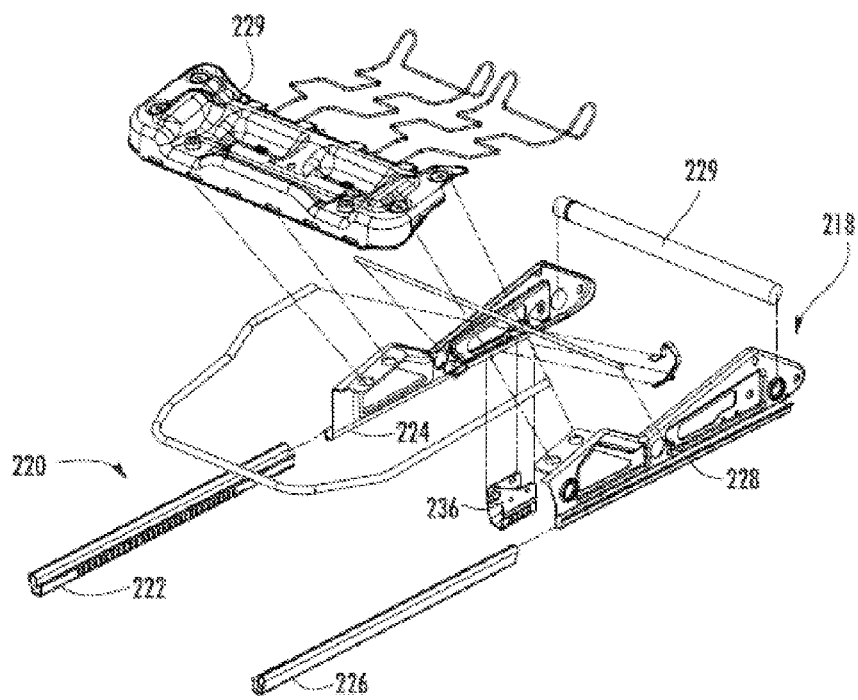
FIG. 11 is an exploded isometric view of the seat track system in FIG. 10.
Figure 12:
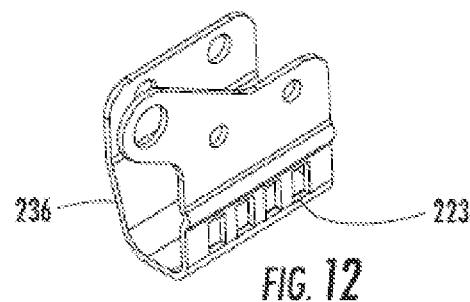
FIG. 12 is an isometric view of a support member of the seat track system in FIG. 11.

Referring to FIGS. 8 and 9, lower inboard track member 22 is an elongated and generally rigid member that is configured to serve as a guide for upper inboard track member 24. In this example, the lower inboard track member 22 includes a channel 32. The channel 32 of lower inboard track member 22 is a generally U-shaped channel that faces downwardly. The channel 32 is formed by two generally vertical sidewalls 42 and 44 (the two legs of the "U") that are joined together by a generally horizontal intermediate wall 46 (the base of the "U"). The location of intermediate wall 46 above base 48 of inboard lower track member 22 defines the height of channel 32. A generally horizontal base 48 extends outward from sidewall 42 opposite of and generally parallel to intermediate wall 46. The intermediate wall 46, sidewall 42 and base 48 define an inwardly facing channel. According to an alternative embodiment, base 48 may include an upwardly extending projection or formed region between a free end of base 48 and sidewall 42 to assist in retaining a friction reducing member (detailed below).

Upper inboard track member 24 is an elongated and generally rigid member having an axial length that is configured to engage lower inboard track member 22 in a manner that allows upper inboard track member 24 to move, translate, displace, slide or the like, in an axial direction of lower inboard track member 22. In this example, the upper inboard track member 24 forms a channel 64. The channel 64 is a generally U-shaped channel that faces upwardly (with one leg of the "U," e.g., a leg closer to the center of vehicle seat 10, being longer than the other). The channel 64 is formed by two generally vertical sidewalls 74 and 76 (the two legs of the "U") that are joined together by an intermediate wall 78 (the base of the "U") that inclines upwardly as it extends from inner sidewall 76 to outer sidewall 74. The outer sidewall 74 is shorter than inner sidewall 76 and extends to a height that is less than the height to which inner sidewall 76 extends. A top portion of outer sidewall 74 and a central portion of inner sidewall 76 include a curved portion that may be provided to receive a friction reducing member, such as a ball, bearing, roller, bushing, rolling element, or the like. While channel 64 is referred to as generally U-shaped, channel 64 is not intended to be limited to any particular shape. According to the various alternative embodiments, channel 64 may be any shape that is suitable for cooperating with lower inboard track member 22 and/or one or more friction reducing members.

When upper track assembly 18 and lower track assembly 20 are assembled (e.g., provided in a use position, or the like), friction reducing members, shown as ball bearings 108 and 110, are provided to maintain the alignment between lower inboard track member 22 and upper inboard track member 24 and/or to reduce the friction between lower inboard track member 22 and upper inboard track member 24 during the movement of upper track assembly 18. In this example, the bearings 108 and 110 each represent a plurality of similarly located bearings that are disposed along the length of seat track system 16, generally between lower inboard track member 22 and upper inboard track member 24. The outer sidewall 74 and at least a portion of the intermediate wall 78 are disposed and move within channel 32 whereas vertical wall 44 and at least a portion of intermediate wall 46 are disposed and move within channel 64. For purposes of this disclosure, the phrases set of bearings and set of friction reducing members are intended to refer to the plurality of similarly located and positioned bearings disposed along the length of a track in a row.

In this example, bearing 108 (and a plurality of similar bearings 108 extending in an axial direction) is generally positioned between intermediate wall 78 of upper inboard track member 24 and the intersection between base 48 and sidewall 42 of lower inboard track member 22. To accommodate bearing 108, intermediate wall 78 is curved upward (the bearing supporting side of intermediate wall 78 is generally concave) and the intersection between base 48 and sidewall 42 of lower inboard track member 22 has a radius that is configured to receive bearing 108. Bearing 110 (and a plurality of similar bearings 110 extending in an axial direction) is generally positioned between sidewall 74 of upper inboard track member 24 and the intersection between intermediate wall 46 and sidewall 44 of lower inboard track member 22, each of which has a radius that is configured to receive bearing 110.

According to other exemplary embodiments, the size of each of the bearings may vary depending on the precise configuration and spacing of the upper and lower tracks. Moreover, the number and location of the friction members or bearings may vary. For example, seat track system 16 may be configured to include bearings at one, two, three, or more than three locations along the cross-section of the track arrangement rather than at four locations. The friction reducing members may be one of a variety of different friction reducing members, including roller bearings, needle bearings, oval-shaped bearings, bushings, slide blocks (plastic blocks), or the like. One or more different types of friction reducing members may be used together in the track arrangement. The bearings may be fixed to, or captured within, one track or may be free to slide or move within the respective channel along the length of the tracks (until they hit the stops). One or more sets of the bearings may be provided in a body, guide, carriage, or cage that fixes the location of each bearing in the set relative to the other bearings in the set but still allows each bearing to freely roll.

Bearings 108 and 110 are substantially trapped within seat track system 16 by the geometry of lower inboard track member 22 and upper inboard track member 24. The clearance or gap 90 between the intersection of intermediate wall 78 and sidewall 76 of upper inboard track member 24 and base 48 is less than the diameter of bearing 108. Similarly, the clearance or gap 92 between sidewall 44 and intermediate wall 78 and gap 94 between sidewall 74 and intermediate wall 46 is less than the diameter of bearing 108.

Referring particularly to FIG. 8, in an unassembled or free state, such as a non-use position, or the like, when upper inboard track member 24 and upper outboard track member 28 are not coupled together via first support member 29 and/or when lower inboard track member 22 and lower outboard track member 26 are not coupled together via second support member 27 there is a clearance or gap 96 between bearing 108 and intermediate wall 78 (or between bearing 108 and the intersection between base 48 and sidewall 42 of lower inboard track member 22) and a clearance or gap 98 between bearing 110 and sidewall 74 of upper inboard track member 24 (or between bearing 110 and the intersection between intermediate wall 46 and sidewall 44 of lower track 22). Lower track assembly 20 is coupled to vehicle 5 by coupling base 48 to a suitable structure such as the floor structure, or an intermediate member, of vehicle 5. Upper track assembly 18 is coupled to vehicle seat 10 by coupling the inner sidewall 76 to the seat bottom 14.

Referring particularly to FIG. 9, when upper track assembly 18 is coupled to lower track assembly 20, such as when the seat track system 16 moves to the use position or the like, inner sidewall 76 of upper inboard track member 24 is deflected and the size of gaps 96 and 98 are reduced, creating an interference between upper inboard track member 24 and lower inboard track member 22 and bearings 108 and 110. The interference between the components of seat track system 16 decreases the free play (or looseness) and increases the stability of the system.

Figure 15:
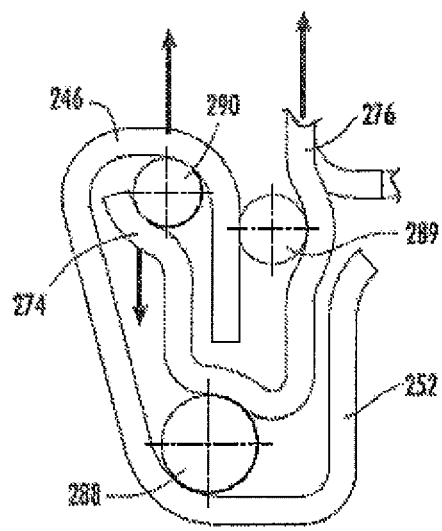
FIG. 15 is a cross-section of the seat track system in FIG. 13 shown without the support member.
Figure 16:
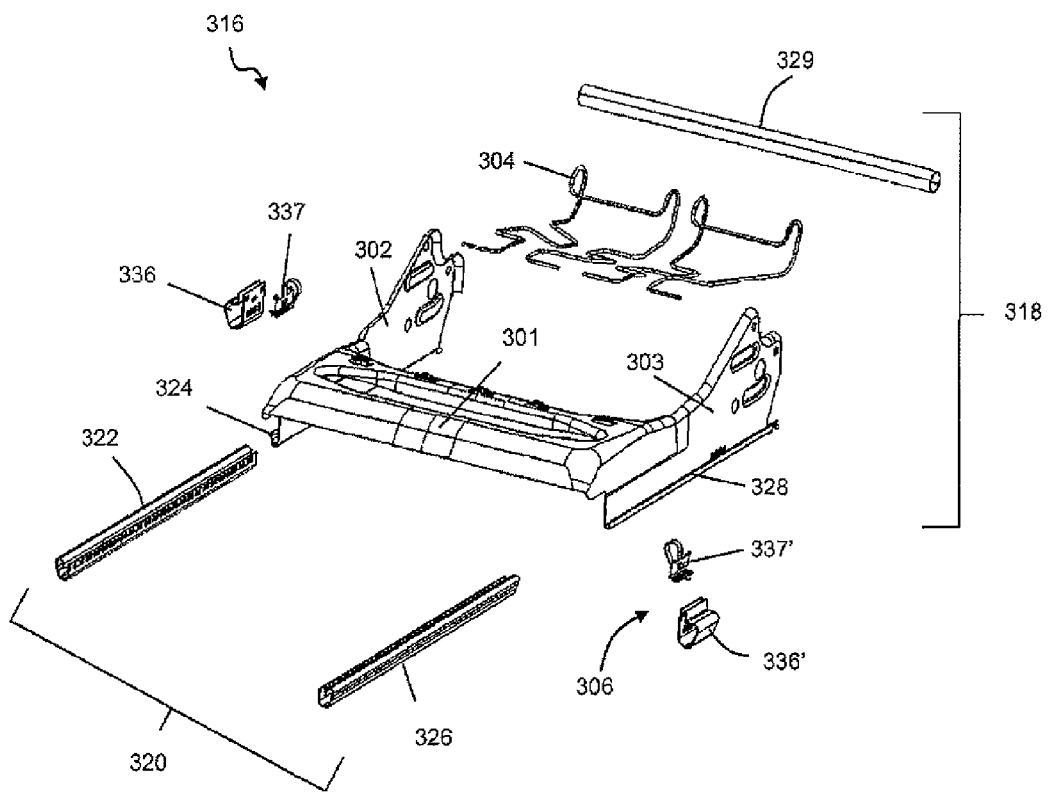
FIG. 16 is an exploded view of a seat track system, according to yet another embodiment.
Figure 17:
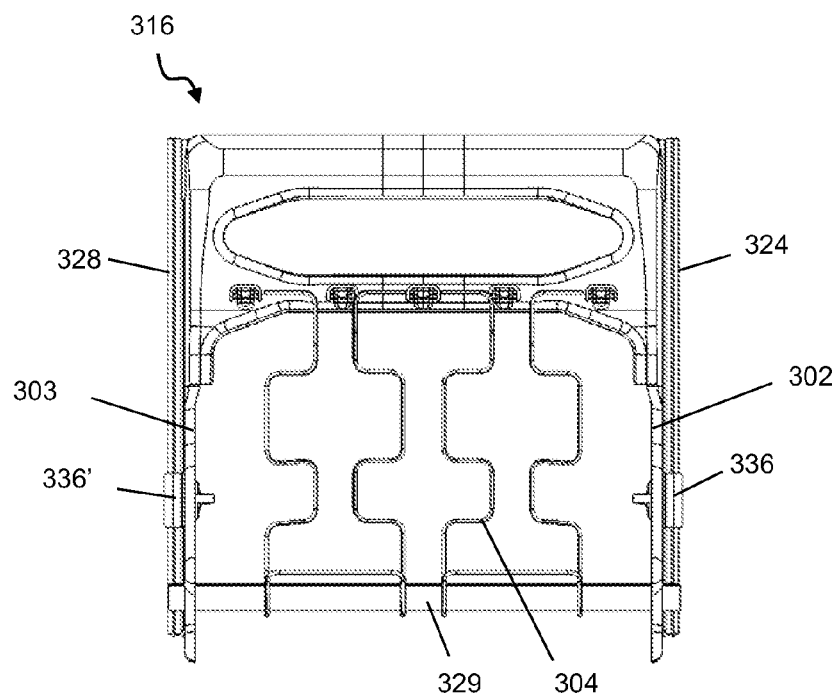
FIG. 17 is a top view of the seat track system in FIG. 16 assembled.
Figure 18:
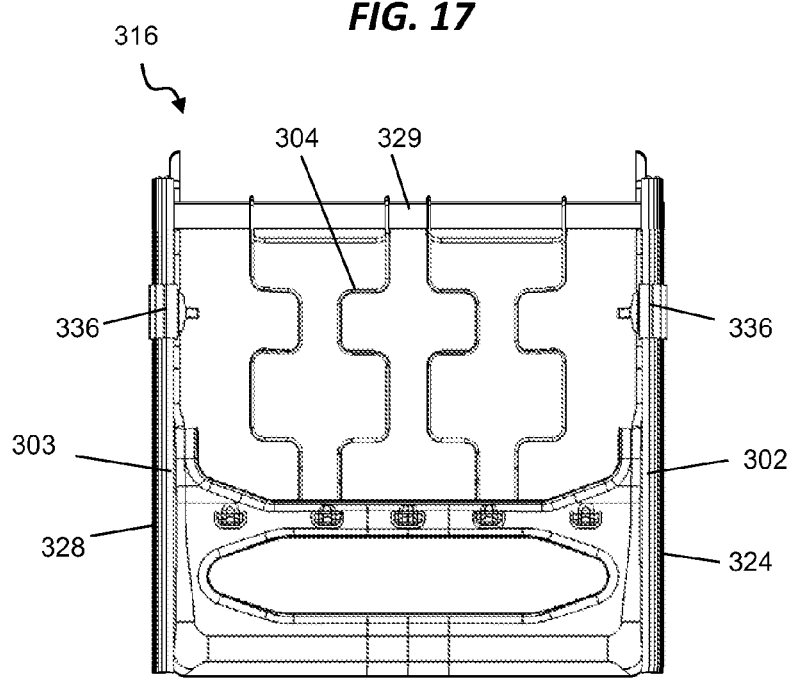
FIG. 18 is a bottom view of the seat track system in FIG. 16 assembled.
Figure 19:
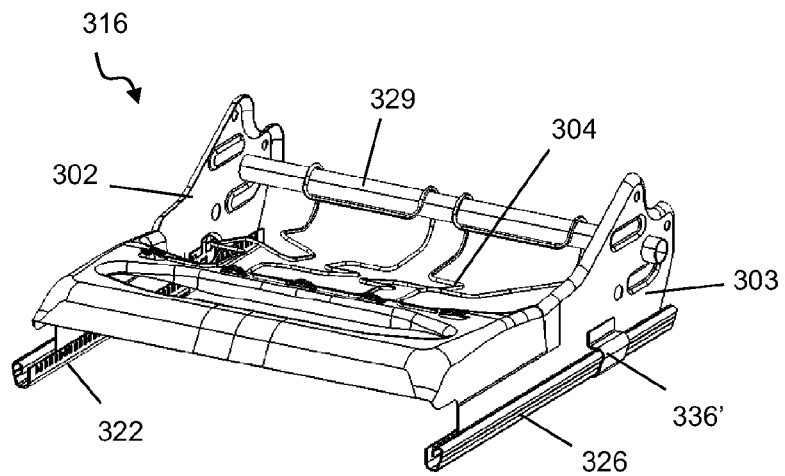
FIG. 19 is an isometric view of the seat track system in FIG. 16 assembled.
Figure 20:
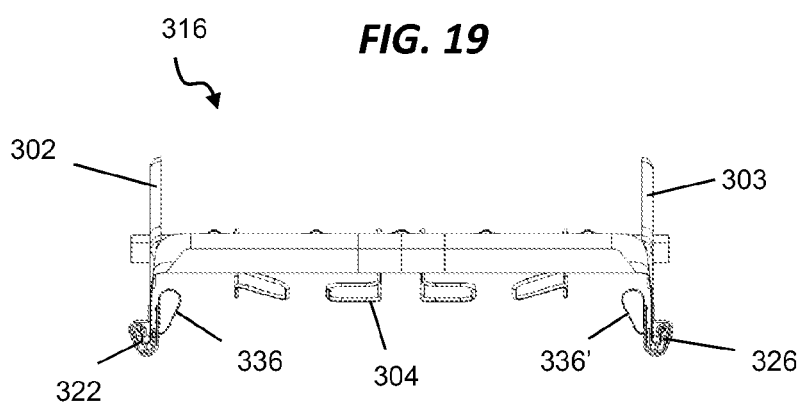
FIG. 20 is a front view of the seat track system in FIG. 16 assembled.
Figure 21:
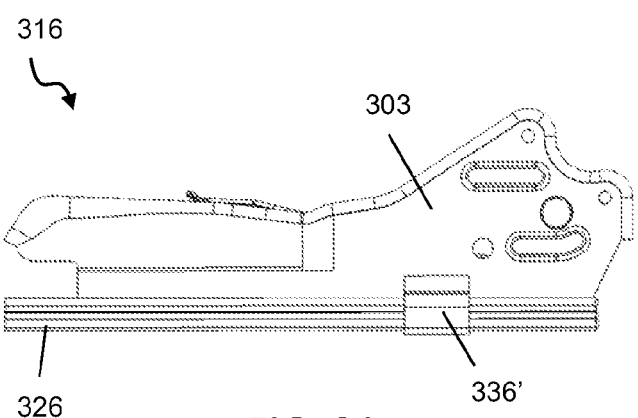
FIG. 21 is a side view of the seat track system in FIG. 16 assembled.
Figure 22:
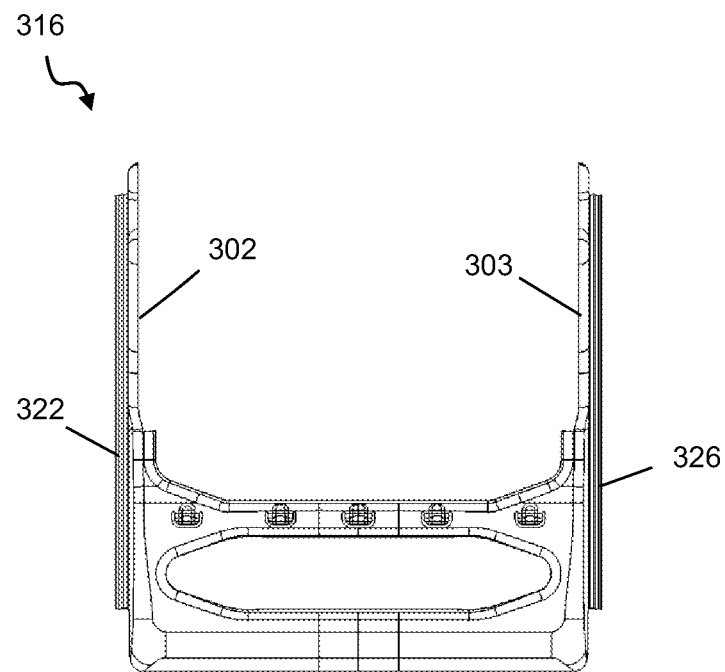
FIG. 22 is a top view of the seat track system in FIG. 16 assembled and with the lower track members, latch members, suspension member, and support member removed.
Figure 23:
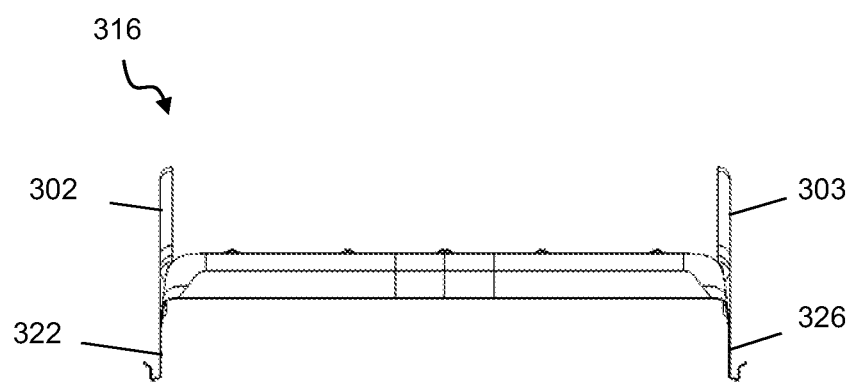
FIG. 23 is a front view of the seat track system in FIG. 22.
Figure 24:
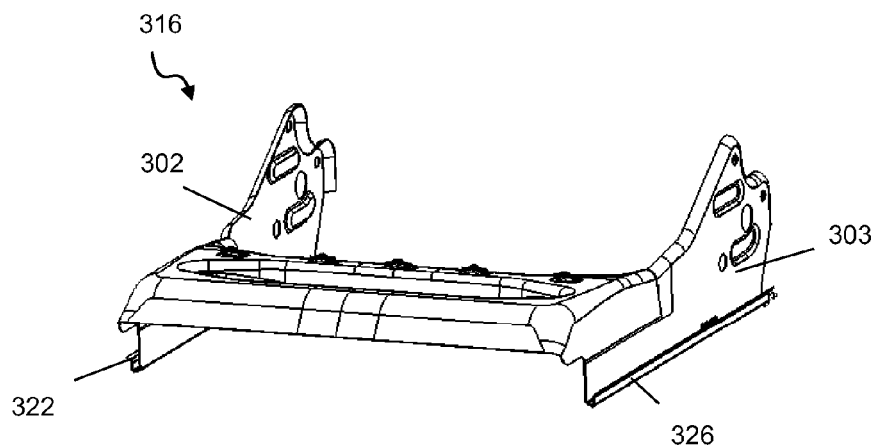
FIG. 24 is an isometric view of the seat track system in FIG. 22.
Figure 25:
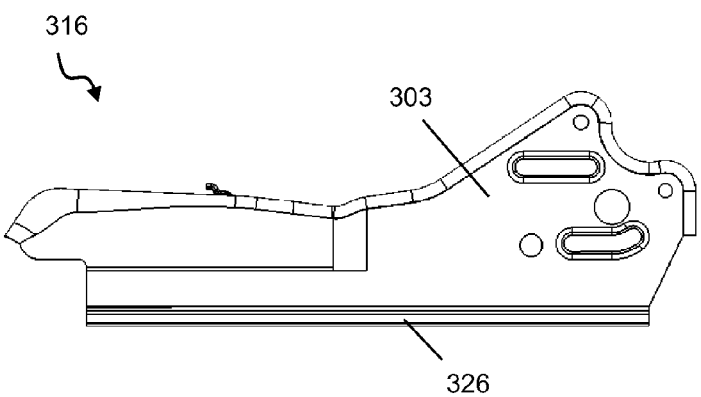
FIG. 25 is a side view of the seat track system in FIG. 22.
Figure 26:
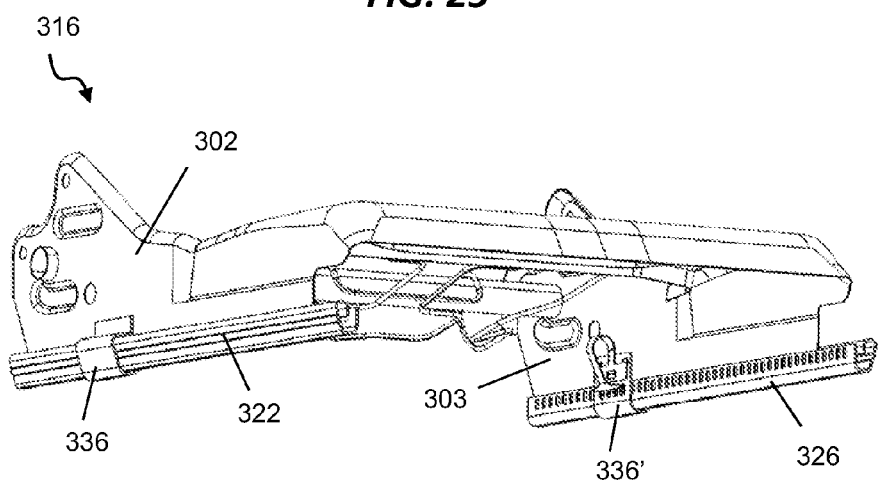
FIG. 26 is a bottom isometric view of the seat track system in FIG. 16 assembled.

The configurations of upper inboard track member 24 and lower inboard track member 22 are not limited to the embodiment shown in FIGS. 4-9. Upper inboard track member 24 and lower inboard track member 22 can be of any configuration that provides for a reduced mass structure that utilizes the rigidity of a vehicle seat and/or the vehicle for its stability. For example, as detailed below, FIG. 15 shows a seat track system 216 according to another exemplary embodiment. Seat track system 216 is similar to seat track system 16, but lower inboard track member 222 includes a third vertical sidewall 252 that extends upward from base 248 opposite vertical wall 242 and sidewall 244 extends further than sidewall 44. Third vertical sidewall 252, base 248 and vertical wall 242 define an upwardly facing channel. Further, an additional friction reducing member, shown as a bearing 289, is positioned between sidewall 276 of upper inboard track member 224 and sidewall 244 of lower inboard track member 222.

Referring now to FIGS. 10-15, a seat track system 216 is shown according to another exemplary embodiment. Seat track system 216 includes an upper track assembly 218 and a lower track assembly 220. According to the embodiment illustrated, upper track assembly 218 generally includes a first track member (right side track member, rail, slide, guide, or the like), shown as an upper inboard track member 224, a second track member (left side track member, rail, slide, guide, or the like), shown as an upper outboard track member 228, and a member (cross support, cross bar, seat base, torsion tube, or the like), shown as a first support member 229, extending between upper inboard track member 224 and upper outboard track member 228.

According to the embodiment illustrated, lower track assembly 220 generally includes a first track member (right side track member, rail, slide, guide, or the like), shown as a lower inboard track member 222, a second track member (left side track member, rail, slide, guide, or the like), shown as a lower outboard track member 226, and a member (cross support, cross bar, floor base, or the like), shown as a second support member 227, extending between lower inboard track member and lower outboard track member 226.

Similar to the exemplary embodiment detailed above with reference to FIGS. 4-9, the configuration and profile of the track members of upper track assembly 218 and lower track assembly 220 provide a reduced cost and reduced mass track system compared to conventional track systems. The mass of the track members can be reduced because seat track system 216 relies upon the structure of vehicle seat 210 and vehicle 5 for stability, strength, rigidity and/or alignment rather than having the track members be self-supportive as conventional track assemblies are configured. For example, upper track assembly 218 may utilize seat bottom 14 as first support member 229, while lower track assembly 220 may utilize the vehicle floor as second support member 227. Further, without first and second support members 229 and 227, upper inboard track member 24 would fall out of alignment with lower inboard track member 222 leaving track system 216 substantially inoperable for its intended purpose.

According to the embodiment illustrated, upper inboard track member 224 is a mirror image of upper outboard track member 228, while lower inboard track member 222 is a mirror image of lower outboard track member 226. Accordingly, the same reference numbers will be used to refer to like components of the upper and lower inboard and outboard track members. According to the various alternative embodiments, the track members need not necessarily be a mirror image.

Figure 14:
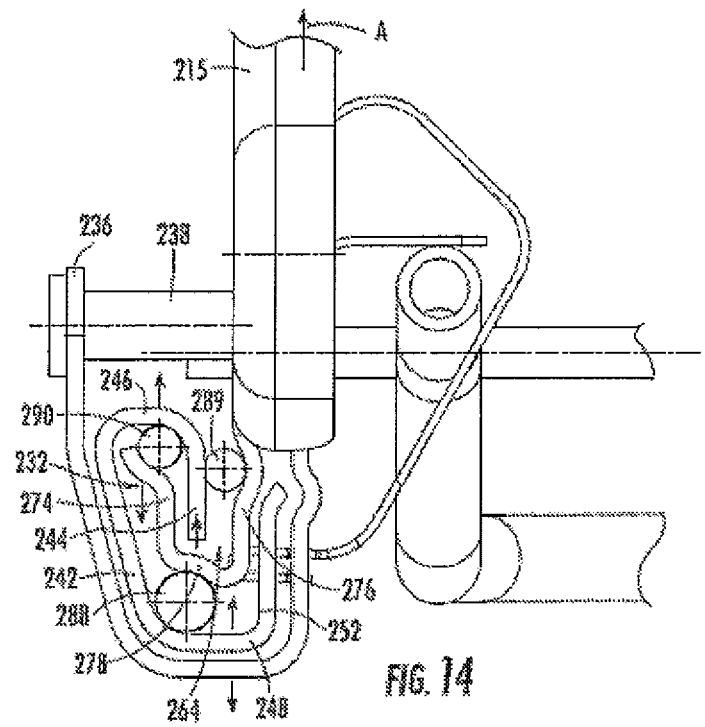
FIG. 14 is a cross-section of the seat track system in FIG. 13 taken through the support member.

Referring in particular to FIG. 14, lower inboard track member 222 (track, rail, slide, guide, or the like) is an elongated and generally rigid member that is configured to be coupled to a structure, such as a floor structure of an automobile, and to generally serve as a guide for upper inboard track member 224. The lower inboard track member 222 includes a channel 232.

The channel 232 of lower inboard track member 222 is a generally U-shaped channel that faces downwardly. Channel 232 is formed by two generally vertical sidewalls 242 and 244 (the two legs of the "U") that are joined together by a generally horizontal intermediate wall 246 (the base of the "U"). The location of intermediate wall 246 above the base 248 of lower inboard track member 222 defines the height of channel 232. A generally horizontal base 248 extends outward from sidewall 242 opposite of and generally parallel to intermediate wall 246. Lower inboard track member 222 further includes a third vertical sidewall 252 that extends upward from base 248 opposite of vertical wall 242.

The upper inboard track member 224 (track, rail, slide, guide, or the like.) is an elongated and generally rigid member having an axial length and is configured to be coupled to lower inboard track member 222 in a manner that allows upper inboard track member 224 to move (translate, displace, slide, or the like) in an axial direction of lower inboard track member 222. The upper inboard track member 224 forms a channel 264. Channel 264 is a generally U-shaped channel that faces upwardly. Channel 264 is formed by two generally vertical sidewalls 274 and 276 (the two legs of the "U") that are joined together by an intermediate wall 278 (the base of the "U") that inclines upwardly as it extends from inner sidewall 276 to outer sidewall 274. The sidewall 276 of upper inboard track member 224 is coupled to a side member 215 of seat bottom 14 (e.g., by being integrally formed therewith, etc.).

Friction reducing members (balls, rollers, bushings, bearings, rolling elements, slide blocks, plastic block, or the like), shown as ball bearings 288, 289 and 290, are intended to provide and maintain the alignment between lower inboard track member 222 and upper inboard track member 224 and/or to reduce the friction between lower inboard track member 222 and upper inboard track member 224 during the movement of upper inboard track member 224. The bearings 288, 289 and 290 each represent a plurality of similarly located bearings that are disposed along the length of seat track system 216, generally between lower inboard track member 222 and upper inboard track member 224. The phrases set of bearings and set of friction reducing members are intended to refer to the plurality of similarly located and positioned bearings disposed along the length of a track in a row. Bearing 288 is generally positioned between intermediate wall 278 of upper inboard track member 224 and intersection of base 248 and sidewall 242 of lower inboard track member 222. To accommodate bearing 288, intermediate wall 278 is formed or curved upward (the bearing supporting side of the intermediate wall 278 is generally concave) and intersection between base 248 and sidewall 242 of lower inboard track member 222 has a radius that is configured to receive bearing 288. Bearing 289 (and the plurality of other similar bearings) is generally positioned between sidewall 276 of upper inboard track member 224 and sidewall 244 of lower inboard track member 222. To accommodate bearing 289, sidewall 276 is formed or curved inward (e.g., the bearing supporting side of intermediate wall 276 is generally concave). Bearing 290 (and the plurality of other similar bearings) is generally positioned between intersection of intermediate wall 278 and sidewall 274 of upper inboard track member 224 and the intersection between intermediate wall 246 and sidewall 244 of lower inboard track member 222, each of which has a radius that is configured to receive bearing 290.

Track assemblies 18 and 20 may be assembled at a first location and shipped to a second location where they are coupled to vehicle seat 10 and to vehicle 5. Alternatively, the track assemblies 18 and 20 may be assembled with vehicle seat 10 at one location and then shipped to a second location for installation into vehicle 5.

Referring to FIGS. 12-15, seat track system 216 also includes a member (e.g., support member, etc.), shown as a reinforcing bracket 236, coupled to upper inboard track member 224 to manage load, such as vertical load, or the like. Reinforcing bracket 236 is configured to alter load transfer that would otherwise be realized by lower inboard track member 222 and upper inboard track member 224 if reinforcing bracket 236 was not provided and a load (A) (shown in FIG. 13) was applied to seat track system 216. For example, reinforcing bracket 236 may distribute at least a portion of the load that would otherwise be realized by lower inboard track member 222 and/or upper inboard track member 224 to other areas on lower inboard track member 222 and/or upper inboard track member 224, other areas on seat track system 216, vehicle seat 10 and/or vehicle 5.

According to the embodiment illustrated, reinforcing bracket 236 at least partially surrounds lower inboard track member 222 and is configured to alter load transfer from upper inboard track member 224 to lower inboard track member 222. Load transfer from upper inboard track member 224 to lower inboard track member 222 may be desirable and/or beneficial due to the reduced mass profile of upper track assembly 218 and lower track assembly 220. In this example, reinforcing bracket 236 is provided as part of a latch system for seat track system 216.

Reinforcing bracket 236 is shown as a relatively thin-walled structure having a generally U-shaped cross section (laterally of the sliding direction of upper inboard track member 224 and lower inboard track member 222). The ends of reinforcing bracket 236 are coupled via one or more fasteners, shown as rivets 238, to side member 215 of seat bottom 14 that extend laterally from side member 215. Reinforcing bracket 236 is generally located complimentary around at least a portion of lower inboard track member 222. The reinforcing bracket 236 includes a multitude of openings 223 that are arranged and located to correspond with openings 221 in lower inboard track member 222. Such openings may be used by a latch system 206 to selectively lock upper track assembly 219 to lower track assembly 220. For example, the latch system may include a latch 237 having a plurality of teeth 239 that operatively engage the openings 223 in the bracket 236 and the openings 221 in lower inboard track member 222. The latch may also be biased, such as by a spring or the like, towards a locked position.

Figure 13:
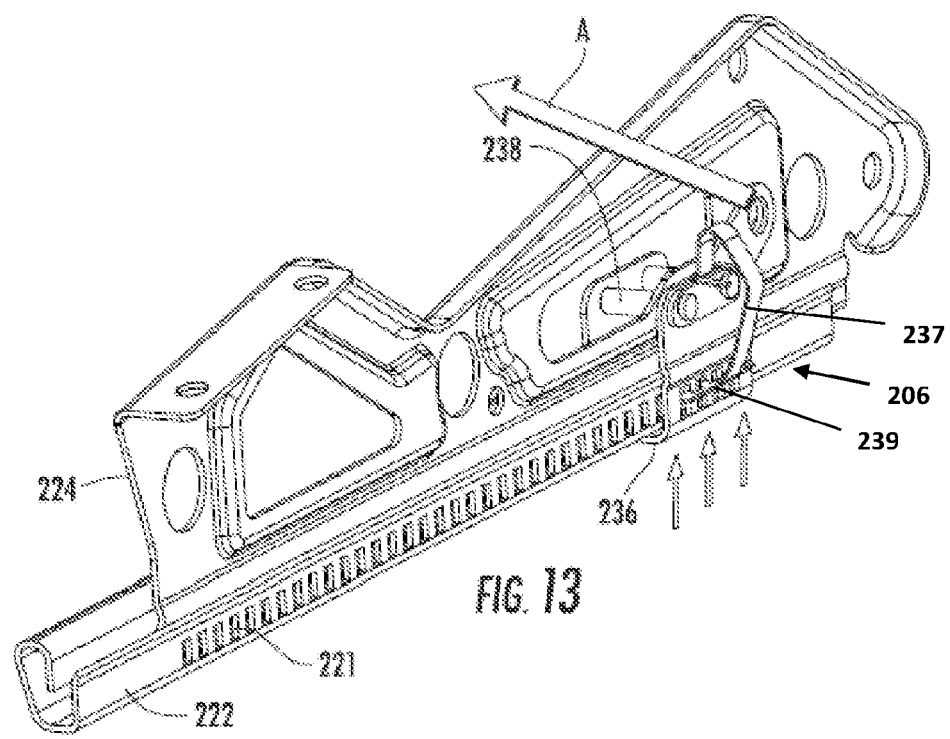
FIG. 13 is an isometric view of the support member in FIG. 12 coupled to the seat track system and showing a load applied to the seat track system.

Referring to FIGS. 13-14 in particular, when a force or load A is applied to seat bottom 14 (in the event of an impact, the vehicle seat occupant may apply a significant force to a safety belt that is coupled to seat bottom 14 and upper inboard track member 224, or the like), such a load is realized by upper track assembly 218 and lower track assembly 220. Such a load (a peeling/separation load, or the like) may attempt to separate the connection or engagement between upper inboard track member 224 and lower inboard track member 222. To reduce the peeling load applied to upper inboard track member 224 and lower inboard track member 222 in this area, reinforcing bracket 236 is provided to alter load transfer.

With the addition of reinforcing bracket 236, reinforcing bracket 236 realizes the load because reinforcing bracket 236 is coupled to seat bottom 14 and upper inboard track member 224. Because reinforcing bracket 236 at least partially surrounds lower inboard track member 222, reinforcing bracket 236 transfers (distributes, directs, or the like) at least a portion of this applied load to the bottom of lower inboard track member 222 thereby lessening the amount of load that must be absorbed between the engagement of upper inboard track member 224 and lower inboard track member 222. As such, reinforcing bracket 236 allows for the entire section of seat track system 216 (or a substantial portion thereof) to be loaded rather than one relatively small portion of the section. Such a configuration and positioning of reinforcing bracket 236 may also change the type of load realized by seat track system from an entirely peeling load to a combination of a peeling load and a bending load.

Referring to FIG. 15, without reinforcing bracket 236, the load applied to seat bottom 14 would have to be absorbed entirely by the engagement of upper inboard track member 224 and lower inboard track member 222, which may cause upper inboard track member 224 to separate or peel away from lower inboard track member 222. It should be noted that the use of reinforcing bracket 236 is not limited to the seat track systems disclosed herein as it may be applicable for use with any seat track system wherein in may be desirable and/or beneficial to transfer a load to other areas of the seat track system and/or vehicle. It should also be noted that reinforcing bracket 236 may also be used to transfer load to another portion of seat track system 16 and/or vehicle 5. For example, reinforcing bracket 236 may be configured to transfer load to another component of vehicle 5 and/or to the actual structure of vehicle 5.

Referring now to FIGS. 16-26, a seat track system is shown according to yet another exemplary embodiment. Seat track system 316 includes an upper track assembly 318 and a lower track assembly 320. According to the embodiment illustrated, upper track assembly 318 is a one-piece unitary member that is integral with and includes a cushion pan 301, a first and second seat bottom frame side member 302, 303, and a first track member (right side track member, rail, slide, guide, or the like), shown as an upper inboard track member 324, and a second track member (left side track member, rail, slide, guide, or the like), shown as an upper outboard track member 328. The upper track assembly 318 also includes a support member (cross support, cross bar, seat base, torsion tube, seat pan, or the like), shown as a first support member 329, extending between upper inboard track member and upper outboard track member. The seat track system 318 further includes a suspension member 304, such as, a spring member, wire mesh member, or the like, that may be coupled to the seat bottom (cushion pan, side members, torsion tube, or the like) for providing support to the seat bottom and for providing support and comfort for a seat occupant. The seat track system 316 further includes a latch system (assembly) 306 which includes a first reinforcement bracket 336 in operative engagement with a first latch 337 and a second reinforcement bracket 336' in operative engagement with a second latch 337', as described above with respect to FIGS. 12-15.

According to the embodiment illustrated, lower track assembly 320 generally includes a first track member (right side track member, rail, slide, guide, or the like), shown as a lower inboard track member 322, a second track member (left side track member, rail, slide, guide, or the like), shown as a lower outboard track member 326, and a member (cross support, cross bar, floor pan, or the like) or second support member (not shown), extending between lower inboard track member 322 and lower outboard track member 326.

Similar to the exemplary embodiment detailed above with reference to FIGS. 4-9, the configuration and profile of the track members of upper track assembly 318 and lower track assembly 320 provide a reduced cost and reduced mass track system compared to conventional track systems. The mass of the track members can be reduced because seat track system 316 relies upon the structure of vehicle seat 310 and vehicle 305 for stability, strength, rigidity and/or alignment rather than having the track members be self-supportive as conventional track assemblies are configured. For example, upper track assembly 318 may utilize seat bottom as first support member, while lower track assembly 320 may utilize the vehicle floor as second support member. Further, without first and second support members and, upper inboard track member would fall out of alignment with lower inboard track member leaving track system substantially inoperable for its intended purpose.

According to the embodiment illustrated, upper inboard track member 324 is a mirror image of upper outboard track member 328, while lower inboard track member 322 is a mirror image of lower outboard track member 326. Accordingly, like components of the upper and lower inboard track members 324, 322 and upper and lower outboard track members 328, 326 are referenced in similar fashion. According to the various alternative embodiments, however, the track members need not necessarily be a mirror image.

The upper track assembly 18 also forms the seat base 14 subframe wherein the upper outboard and inboard track members 24, 28 have a substantially planar portion extending from the track portion. The planar portion serves as a seat base side frame members. The planar portion and the track portion may be formed integrally with one another to form a single unitary (one-piece) member. The support members 29 act as seat base cross members and are coupled to the upper outboard and inboard track members 24, 28 to form a substantially rectangular seat base frame.

The lower inboard track member 322 (track, rail, slide, guide, or the like) is an elongated and generally rigid member that is configured to be coupled to a structure, such as a floor structure of an automobile, and to generally serve as a guide for upper inboard track member 324. In one example, lower inboard track member 322 includes a channel as previously described. The embodiment illustrated in FIGS. 16-26 generally incorporate the details of the track system (such as the track members, channels, side walls, intermediate walls, friction reducing members/bearings, gaps, or the like) as described above and illustrated in the FIGS. 1-15.

The seat track systems described above and illustrated in FIGS. 1-26 may be formed using tailored welding technology and/or cold forming technology as described in International Application Number PCT/US09/61027 and incorporated in its entirety by reference herein. Generally, tailored welding technologies, cold forming technologies, tailor welded blanks (TWBs), tailored welded coils (TWCs), tailored welded tubes (TWTs), and the like, may be selectively employed to customize the seat track assembly and/or one or more individual components (e.g., track member, latch member, cushion pan, side member, etc.) of the seat track assembly such that the seat track assembly and/or one or more of the individual components of the seat track assembly include one or more portions (sections, segments, parts, etc.) having different material properties (e.g., made from different material, material type, strength, thickness, length, shape, size, etc.) to thereby enhance performance and further reduce mass and cost of the seat track assembly.

Many modifications and variations of the present disclosure are possible in light of the above teachings. Therefore, within the scope of the appended claim, the present disclosure may be practiced other than as specifically described.

What is claimed is:

1. A seat track system for use in a vehicle seat assembly having a seat base frame, the seat track system comprising:
   a lower track assembly having a first lower track and a second lower track that is adjacent the first lower track, the first lower track having a channel and the second lower track having a channel; and
   an upper track assembly having a first upper track having a channel and slidably disposed within the first lower track and a second upper track having a channel and that is adjacent the first upper track and slidably disposed within the second lower track, and the first upper track has a portion extending upwards that integrally forms a first side member of the seat base frame and the second upper track has a portion extending upwards that integrally forms a second side member of the seat base frame, wherein the first upper track includes a plurality of openings and the first lower track includes a plurality of corresponding openings that are interlockably engaged with one another by a latch mechanism, further comprising a reinforcement bracket having a plurality of openings corresponding to the openings on the first upper track and the first lower track, wherein the reinforcement bracket is coupled to at least one of the first lower track and the second lower track and a lower portion of the reinforcement bracket extends under a lower portion of the first lower track to manage the vertical load between the first upper track and the first lower track and to prevent separation of the first upper track from the first lower track.

2. The seat track system of claim 1, further comprising a seat cushion pan integrally formed with the first side member upper end and the second side member upper end, wherein the first upper track, the first side member, the second upper track, the second side member, and the seat cushion pan are formed integrally as a one-piece unitary member.

3. The seat track system of claim 1, wherein at least a portion of the first upper track is slidably disposed within the first lower track channel and at least a portion of the second upper track is slidably disposed within the second lower track channel, and at least a portion of the first lower track is slidably disposed within the first upper track channel and at least a portion of the second lower track is slidably disposed within the second upper track channel.

4. The seat track system of claim 1, wherein the reinforcement bracket includes a latch member having a plurality of teeth for operatively engaging the reinforcement bracket openings, the first upper track openings, and the first lower track openings thereby interlocking the reinforcement bracket, the first upper track and the first lower track together.

5. The seat track system of claim 1, further comprising a plurality of friction reducing members disposed between the first upper track and the first lower track and between the second upper track and the second lower track.

6. A seat track system for use in a vehicle seat assembly, the seat track system comprising:
a seat base frame including a first side member having an upper end, a lower end, a front end, and a rear end, and a second side member having an upper end, a lower end, a front end, and a rear end, and a front cross member having a first end and a second end, and a rear cross member having a first end and a second end;
a lower track assembly having a first lower track and a second lower track that is adjacent the first lower track, the first lower track having a channel and the second lower track having a channel; and
an upper track assembly having a first upper track having a channel and slidably disposed within the first lower track and a second upper track having a channel and that is adjacent the first upper track and slidably disposed within the second lower track such that the first upper track is integrally formed with the first side member lower end as a one-piece unitary member and the second upper track is integrally formed with the second side member lower end as a one piece unitary member; and further comprising a reinforcement bracket having a plurality of openings corresponding to a plurality of openings in the first upper track and a plurality of corresponding openings in the first lower track, such that the reinforcement bracket is coupled to the first lower track and the second lower track and a lower portion of the reinforcement bracket extends under a lower portion of the first lower track to manage the vertical load between the first upper track and the first lower track and to prevent separation of the first upper track from the first lower track.

7. The seat track system of claim 6, wherein at least a portion of the first upper track is slidably disposed within the first lower track channel and at least a portion of the second upper track is slidably disposed within the second lower track channel, and at least a portion of the first lower track is slidably disposed within the first upper track channel and at least a portion of the second lower track is slidably disposed within the second upper track channel.

8. The seat track system of claim 6, further comprising a seat cushion pan formed integrally with the first side member upper end and the second side member upper end, wherein the seat cushion pan, the first side member, the second side member, the first upper track and the second upper track form a one-piece unitary member.

9. The seat track system of claim 6, wherein the first upper track includes a plurality of openings and the first lower track includes a plurality of corresponding openings that are interlockably engaged with one another by a latch mechanism.

10. The seat track system of claim 6, wherein the reinforcement bracket includes a latch member having a plurality of teeth for operatively engaging the reinforcement bracket openings, the first upper track openings, and the first lower track openings thereby interlocking the reinforcement bracket, the first upper track and the first lower track together.

11. The seat track system of claim 6, further comprising a plurality of friction reducing members disposed between the first upper track and the first lower track and between the second upper track and the second lower track.

12. A seat track system for use in a vehicle seat assembly having a seat base frame, the seat track system comprising:
a lower track assembly having a first lower track and a second lower track that is adjacent the first lower track, the first lower track having a channel and the second lower track having a channel; and
an upper track assembly having a first upper track having a channel that is slidably disposed within the first lower track, and the first upper track has a portion extending upwardly that is integrally formed with a first side member of the seat base frame;
a second upper track in the upper track assembly having a channel and that is adjacent the first upper track and slidably disposed within the second lower track, and the second upper track has a portion extending upwards that integrally formed with a second side member of the seat base frame, wherein each of the first upper track and the first lower track includes a plurality of openings that are interlockably engaged with one another by a latch mechanism;
a seat cushion pan formed integrally with the first side member upper end and the second side member upper end, wherein the seat cushion pan, the first side member, the second side member, the first upper track and the second upper track form a one-piece unitary member; and further comprising a reinforcement bracket having a plurality of openings corresponding to the plurality of openings in the first upper track and the plurality of corresponding openings in the first lower track, such that the reinforcement bracket is coupled to the first lower track and the second lower track and a lower portion of the reinforcement bracket extends under a lower portion of the first lower track to manage the vertical load between the first upper track and the first lower track and to prevent separation of the first upper track from the first lower track.

* * * * *